United States Patent
Pandya et al.

(10) Patent No.: US 8,909,212 B2
(45) Date of Patent: Dec. 9, 2014

(54) METHOD AND APPARATUS FOR DISCLAIMER PRESENTATION AND CONFIRMATION

(71) Applicant: Ford Global Technologies, LLC, Dearborn, MI (US)

(72) Inventors: Ritesh Pandya, Rochester Hills, MI (US); Gary Jablonski, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 92 days.

(21) Appl. No.: 13/804,125

(22) Filed: Mar. 14, 2013

(65) Prior Publication Data
US 2014/0274027 A1   Sep. 18, 2014

(51) Int. Cl.
*H04M 3/00* (2006.01)
*H04W 4/00* (2009.01)

(52) U.S. Cl.
CPC ....................... *H04W 4/001* (2013.01)
USPC ........ 455/420; 455/418; 455/419; 455/575.9; 455/569.2

(58) Field of Classification Search
CPC .......... B06Q 1/00; H04W 4/00; H04W 4/046; H04W 4/003; H04W 4/008; H04W 4/02; G06K 9/00832; G08G 1/207
USPC ............................ 455/418, 419, 575.9, 569.2
See application file for complete search history.

(56) References Cited

U.S. PATENT DOCUMENTS

| | | |
|---|---|---|
| 5,877,897 A * | 3/1999 | Schofield et al. ............. 359/604 |
| 6,539,078 B1 | 3/2003 | Hunt et al. |
| 6,668,221 B2 | 12/2003 | Harter, Jr. et al. |
| 6,842,677 B2 | 1/2005 | Pathare |
| 6,903,652 B2 | 6/2005 | Noguchi et al. |
| 7,194,069 B1 | 3/2007 | Jones et al. |
| 7,246,062 B2 | 7/2007 | Knott et al. |
| 7,337,113 B2 | 2/2008 | Nakagawa et al. |
| 7,565,230 B2 | 7/2009 | Gardner et al. |
| 7,764,189 B2 | 7/2010 | Rubins et al. |
| 7,783,475 B2 | 8/2010 | Neuberger et al. |

(Continued)

FOREIGN PATENT DOCUMENTS

| | | |
|---|---|---|
| JP | 20070241122 | 9/2007 |
| JP | 20110088502 | 5/2011 |

OTHER PUBLICATIONS

Driver Focus-Telematics Working Group, Statement of Principles, Criteria and Verification Procedures on Driver Interactions with Advanced In-Vehicle Information and Communications Systems, Including 2006 Updated Sections, Jun. 26, 2006.

(Continued)

*Primary Examiner* — Charles Shedrick
(74) *Attorney, Agent, or Firm* — Jennifer M. Stec; Brooks Kushman P.C.

(57) ABSTRACT

A system includes a processor configured to select a message. The processor is also configured to determine if a phone is wirelessly connected to a vehicle computing system. The processor is further configured to display the message if no wirelessly connected phone is found. The processor is additionally configured to determine if the message was displayed during a connected phone's earlier connection. Also, the processor is configured to display the message if the message was not previously displayed during the connected phone's earlier connection. Further, the processor is configured to skip display of the message if the message was previously displayed during the connected phone's earlier connection.

20 Claims, 4 Drawing Sheets

(56) References Cited

U.S. PATENT DOCUMENTS

| | | | |
|---|---|---|---|
| 7,826,945 | B2 | 11/2010 | Zhang et al. |
| 7,830,271 | B2 | 11/2010 | Rubins et al. |
| 7,881,940 | B2 | 2/2011 | Dusterhoff |
| 8,116,437 | B2 | 2/2012 | Stillman et al. |
| 8,285,453 | B2 | 10/2012 | Schroeder et al. |
| 8,502,642 | B2 | 8/2013 | Vitito |
| 8,779,947 | B2 * | 7/2014 | Tengler et al. ............... 340/989 |
| 2003/0004730 | A1 | 1/2003 | Yuschik |
| 2003/0055643 | A1 | 3/2003 | Woestemeyer et al. |
| 2003/0099335 | A1 | 5/2003 | Tanaka et al. |
| 2003/0220725 | A1 | 11/2003 | Harter, Jr. et al. |
| 2004/0176906 | A1 | 9/2004 | Matsubara et al. |
| 2004/0267534 | A1 | 12/2004 | Beiermeister et al. |
| 2005/0125110 | A1 | 6/2005 | Potter et al. |
| 2005/0215241 | A1 | 9/2005 | Okada |
| 2006/0142917 | A1 | 6/2006 | Goudy |
| 2006/0276184 | A1 * | 12/2006 | Tretyak et al. ............... 455/418 |
| 2007/0072616 | A1 | 3/2007 | Irani |
| 2007/0255568 | A1 | 11/2007 | Pennock |
| 2008/0070616 | A1 | 3/2008 | Yun |
| 2008/0091433 | A1 * | 4/2008 | Dusterhoff ................... 704/275 |
| 2009/0085728 | A1 | 4/2009 | Catten et al. |
| 2009/0275281 | A1 | 11/2009 | Rosen |
| 2010/0191535 | A1 * | 7/2010 | Berry et al. ................... 704/275 |
| 2010/0210254 | A1 | 8/2010 | Kelly et al. |
| 2010/0233959 | A1 | 9/2010 | Kelly et al. |
| 2010/0279626 | A1 | 11/2010 | Bradley et al. |
| 2011/0003587 | A1 | 1/2011 | Belz et al. |
| 2011/0009107 | A1 | 1/2011 | Guba et al. |
| 2011/0021234 | A1 | 1/2011 | Tibbitts et al. |
| 2011/0076996 | A1 | 3/2011 | Burton et al. |
| 2011/0084852 | A1 | 4/2011 | Szczerba |
| 2011/0115616 | A1 | 5/2011 | Caspe-Detzer et al. |
| 2011/0115618 | A1 | 5/2011 | Catten et al. |
| 2011/0166748 | A1 | 7/2011 | Schneider et al. |
| 2011/0260884 | A1 * | 10/2011 | Yi et al. ................... 340/870.02 |
| 2012/0041633 | A1 * | 2/2012 | Schunder et al. ............ 701/29.2 |
| 2012/0282906 | A1 * | 11/2012 | Frye et al. ................. 455/414.2 |

OTHER PUBLICATIONS

Ford Motor Company, "SYNC with Navigation System," Owner's Guide Supplement, SYNC System Version 1 (Jul. 2007).

Ford Motor Company, "SYNC," Owner's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem", Automotive Design & Production, Oct. 2003, http://findarticles.com, pp. 1-3.

Office Action for corresponding FMC 2657 PCN, application No. 200980155220.9, dated Aug. 30, 2013, 9 pages.

* cited by examiner

METHOD AND APPARATUS FOR DISCLAIMER PRESENTATION AND CONFIRMATION

TECHNICAL FIELD

The illustrative embodiments generally relate to a method and apparatus for disclaimer presentation and confirmation.

BACKGROUND

On-board GPS systems and vehicle electronic identifiers, such as electronic serial numbers (ESNs) or vehicle identification numbers (VINs) can be utilized to track a vehicle. Of course this raises both personal and legal privacy concerns. If a software process or an entity is tracking a vehicle, they may be legally obligated or advised to provide a disclaimer to a tracked party within the vehicle. Additionally or alternatively, it may be advisable to notify a party that one or more connected services is tracking a vehicle, so that the party doesn't feel like their privacy is being violated.

U.S. Pat. No. 7,881,940 generally relates to a system that has a speech control interface operable to provide a speech sequence to which a user response is required before system functionality is operational. A user response can be provided via a spoken command. The system is operable, in response to interruption of the speech sequence to permit a non-verbal user response using an alternative interface.

U.S. Pat. No. 8,285,453 generally relates to a vehicle navigation aid (nav-aid) system and method that provide un-lock nav-aid functions in a moving vehicle. Sensors within the vehicle provide vehicle speed S and whether a person other the driver is present. For S greater than predetermined threshold speed Sth≥0, the nav-aid system remains in a locked-out state if a passenger is not present. When a passenger is present, then the system may accept some otherwise locked-out nav-aid requests. A warning and disclaimer message requiring positive acknowledgement thereof is desirable. In a preferred embodiment, the passenger should occupy a front seat and have a weight or size or both exceeding a predetermined (e.g., "adult") threshold. Desirably, navigation aid access is precluded for S>Sth unless the occupied seat belts are latched. In a further embodiment, a user access status display indicates which nav-aid functions can be accessed depending on the vehicle status.

SUMMARY

In a first illustrative embodiment, a system includes a processor configured to select a message. The processor is also configured to determine if a phone is wirelessly connected to a vehicle computing system. The processor is further configured to display the message if no wirelessly connected phone is found. The processor is additionally configured to determine if the message was displayed during a connected phone's earlier connection. Also, the processor is configured to display the message if the message was not previously displayed during the connected phone's earlier connection. Further, the processor is configured to skip display of the message if the message was previously displayed during the connected phone's earlier connection.

In a second illustrative embodiment, a computer-implemented method includes selecting a message and determining if a phone is wirelessly connected to a vehicle computing system. The method also includes displaying the message if no wirelessly connected phone is found. The method further includes determining if the message was displayed during a connected phone's earlier connection. Additionally, the method includes displaying the message if the message was not previously displayed during the connected phone's earlier connection and skipping display of the message if the message was previously displayed during the connected phone's earlier connection.

In a third illustrative embodiment, a non-transitory computer readable storage medium, stores instructions that, when executed, cause a processor to perform a method including selecting a message and determining if a phone is wirelessly connected to a vehicle computing system. The method also includes displaying the message if no wirelessly connected phone is found. The method further includes determining if the message was displayed during a connected phone's earlier connection. Additionally, the method includes displaying the message if the message was not previously displayed during the connected phone's earlier connection and skipping display of the message if the message was previously displayed during the connected phone's earlier connection.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
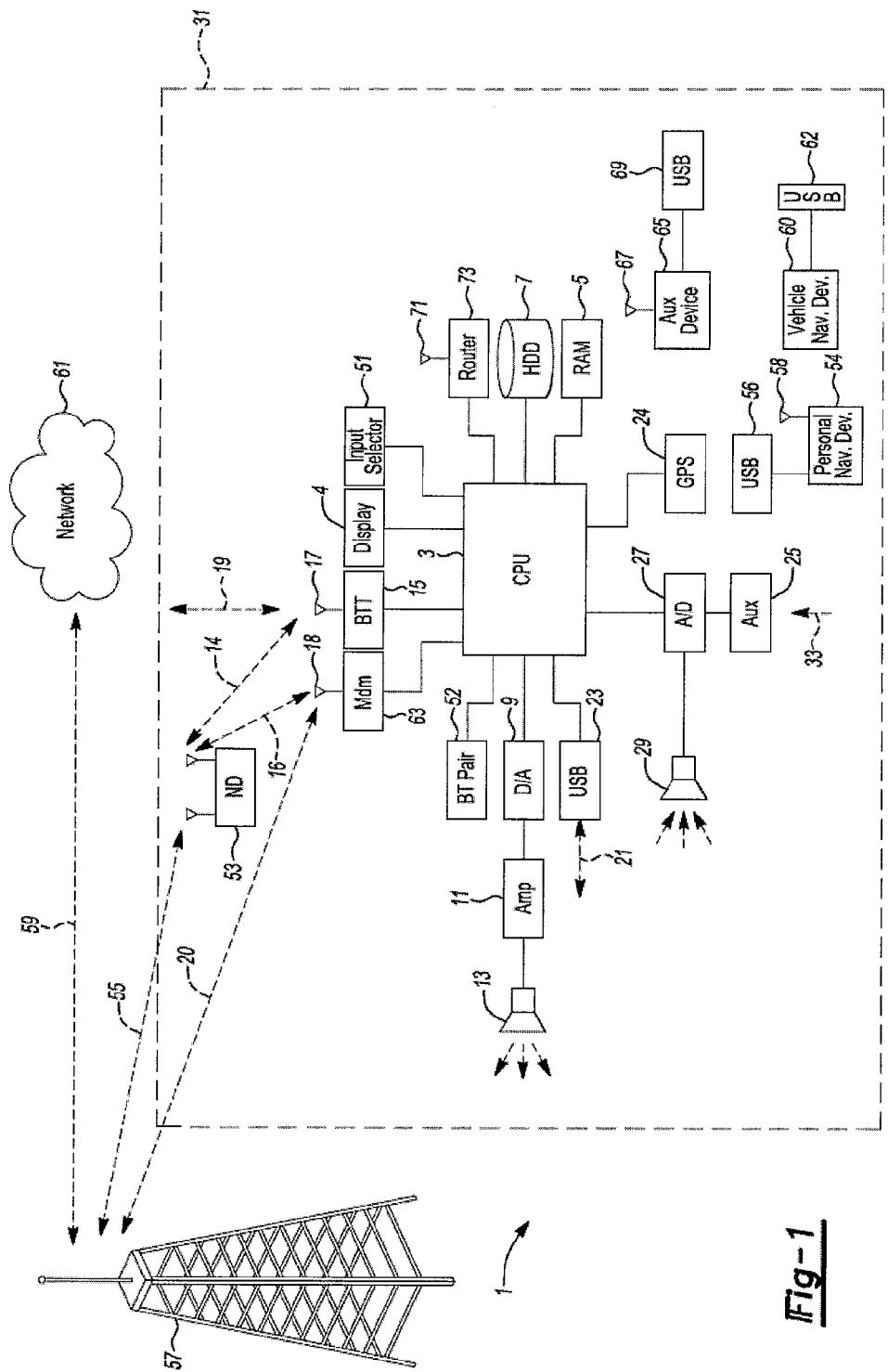
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domian Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Connected services and even certain mobile applications may desire to track a vehicle utilizing on-board GPS functionality. For example, applications which track a user location may update a user's position periodically. Similarly, connected services may track a vehicle for purposes of providing advertisements, recommended points of interest and other features of driver interest related to local positioning.

Whenever tracking is engaged, it may be desirable to present a disclaimer or notification to a user that tracking has been engaged. This helps ensure that the user agrees with being tracked, and doesn't later complain that the tracking was done without their knowledge. Additionally or alternatively, there may be any number of situations where a disclaimer or other agreement may need to be presented to a vehicle occupant.

In order to avoid overly annoying a vehicle occupant, it would be useful if, once that occupant has signed off on an agreement, the agreement doesn't need to be re-presented to the occupant every time the occupant engages the service or enters the vehicle. Unfortunately, it can be difficult to determine if a particular occupant has previously agreed to a given disclaimer. That is, even though a disclaimer has been agreed to within a vehicle, the driver or agreeing occupant may have changed (since multiple people may use a vehicle). While facial recognition and other advanced features may be useful in identifying an agreeing occupant, many vehicles are not equipped with such functionality.

In vehicles not equipped with cameras usable to identify an occupant, there may still be a reasonable way to determine if a particular occupant is present in a vehicle. Many vehicles are provided with wireless infotainment systems, which can connect to an occupant phone. While vehicle drivers and occupants may change, typically, each occupant having a phone is the sole possessor of that phone. This means that if a given phone is connected to the infotainment system, it can be reasonably, although not perfectly, certain that a given occupant is present and agreeing to a presented disclaimer. In this manner, if a certain phone is connected in a vehicle, and if the disclaimer or agreement is presented and accepted, there is a reasonable degree of certainty that the same occupant is still present in later situations where the same phone is connected and recognized.

For example, if tracking is enabled, a message such as "this vehicle is equipped with a telematics system which may send GPS location information to the registered owners of the account associated with this vehicle." Additionally, an option to agree may be provided, or the information may be provided for notification purposes only. Then, it can be assumed that the owner of a connected phone has seen and/or agreed to the notification. When that phone is detected in the future, it is assumed that the agreement/recognition still applies. This can help prevent repeated instances of a message, although it may be useful to periodically re-present the message after some elapsed time period, so that the device owner is reminded. Even so, this avoids having to view the message upon every entry into the vehicle.

Figure 2:
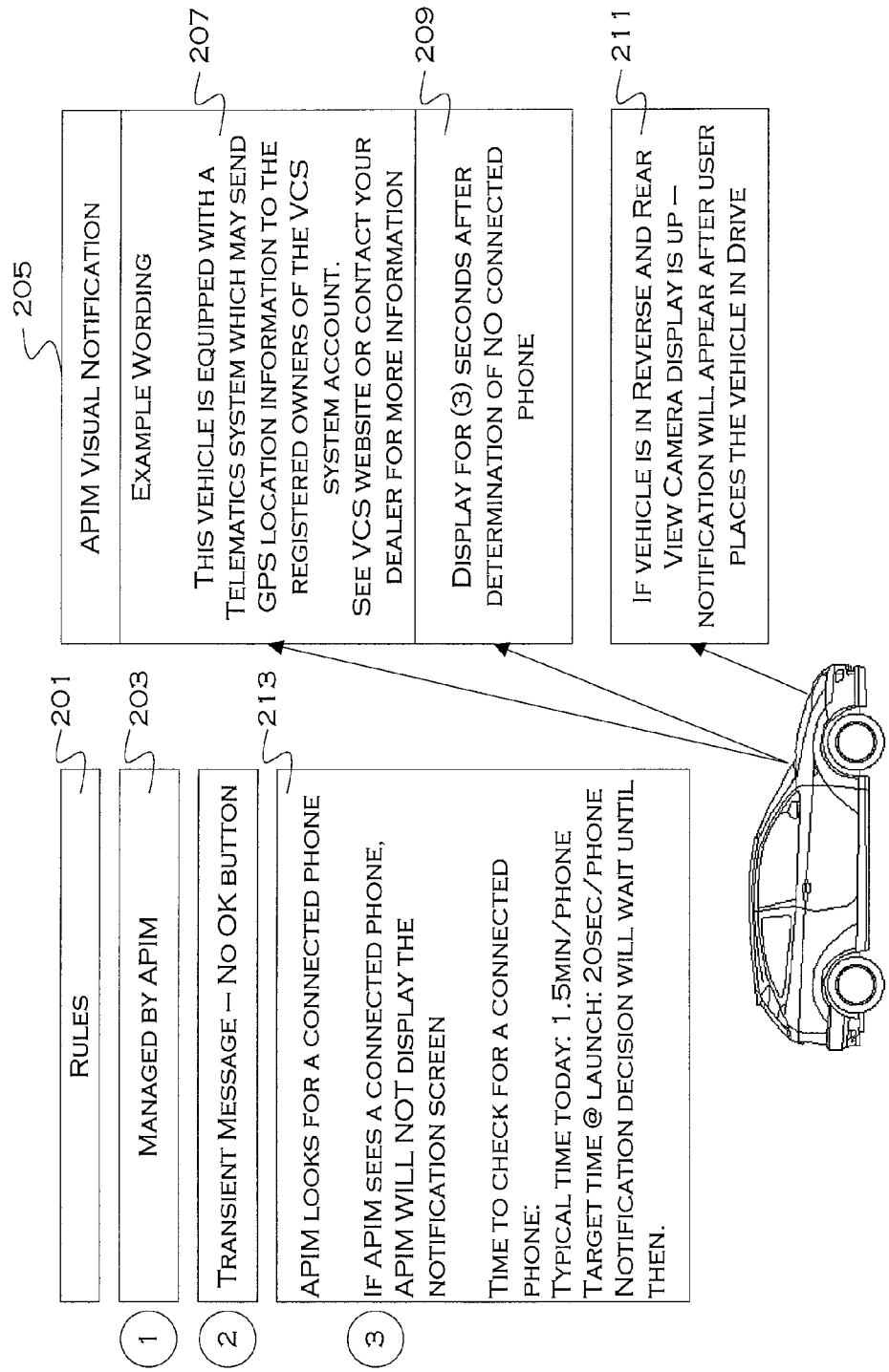
FIG. 2 shows an illustrative example of a presentation strategy process for a user.

FIG. 2 shows an illustrative example of an presentation strategy process for a user. In this illustrative example, a set of rules 201 can be maintained by an onboard vehicle computing system. The onboard system can be connected to a remote server through a connected wireless device, and these rules can be updated as deemed necessary by a provider of the tracking or connected services (e.g., OEM, app provider, etc.).

In this illustrative example, the rules are managed by an APIM 203, which is utilized to determine if a notification or agreement screen should be presented to a driver. If the APIM sees a connected phone, the APIM may choose not to display a notification screen 213. The decision to choose whether or not to display the screen may be based on, for example, whether or not the connected phone has been previously connected and associated with the same notification. Versions of notifications may be tracked too, so that new versions of notifications may be displayed to previously connected phones.

If the APIM does not find or recognize a connected phone, it may display the notification screen. Or, in another instance, if a new notification screen, which does not correspond to any previously connected phone is displayed, the process may display that screen.

An exemplary visual notification 205 which may be displayed if no connected device is present (or no device for which the disclaimer was previously presented) is shown 207. This wording may be displayed for some time period 209 based on the determination of the device connection. In another example, if the device was previously connected, but the warning was shown based on an elapsed time period (i.e., a reminder-type warning), the device may show the warning for a shorter period (a reminder period) of time. Also, in this embodiment, if a device is in reverse, and a rear camera display is up, the process may delay display until such time as the camera is no longer being utilized (i.e., the vehicle is no longer in reverse).

Figure 3:
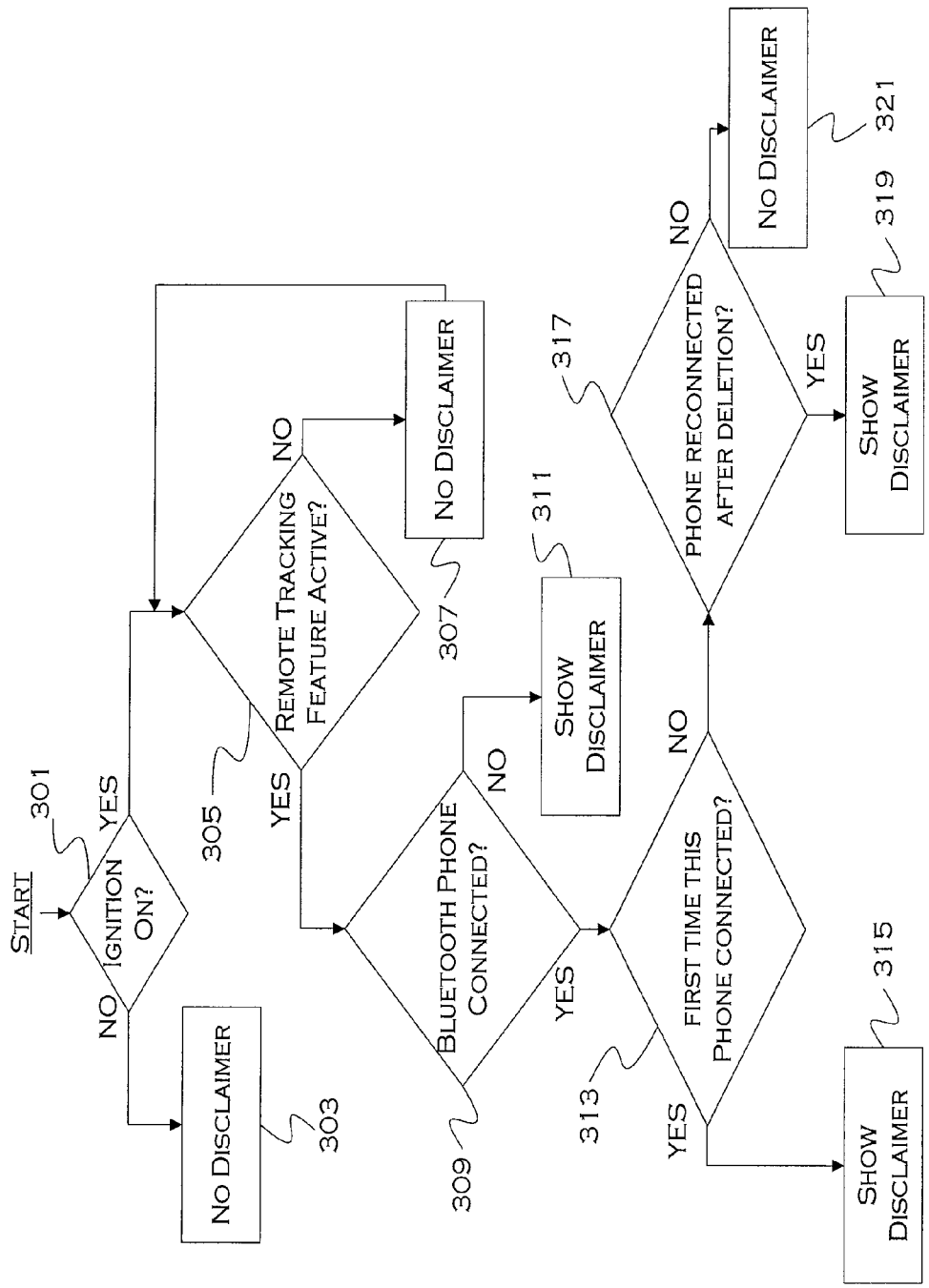
FIG. 3 shows an illustrative example of a process for presenting a disclaimer to an occupant.

FIG. 3 shows an illustrative example of a process for presenting a disclaimer to an occupant. In this illustrative example, a process running on a vehicle computing system, for example (or running on a wireless connected device, or running on a remote server in communication with the vehicle). First, in this process, the VCS (in this example) determines if the ignition is on 301. If not, no disclaimer is displayed 303.

Next, once the ignition has been enabled, the process determines if remote tracking is enabled 305. This may be determined via a flag, a notification from an application or a remote server, or through any other reasonable means. Although remote tracking is used as an example in this illustrative embodiment, any suitable feature or function to which a notification may correspond may be detected. Or, in other instances, a general notification may be displayed relating to some matter to which the driver should be made aware or to which the driver should agree.

If there is no remote tracking (or other appropriate notification condition) present 305, the process may go to a no disclaimer state 307. Alternatively, if a notification provision condition 305 is met, the process may then check to see if a Bluetooth (or other identifiable) phone has been connected to the vehicle 309. If there is no phone connected, there is no way (under this process) to identify an occupant, so a disclaimer is provided 311. In other examples, secondary means of identification may be used prior to or following a Bluetooth check (such as, but not limited to, camera identification, other device identification, voice identification, etc.).

If there is a connected phone, the process may then determine if this is the first time the phone has been connected 313. If that is the case, that signals that the owner of this phone has either not heard the message, not connected the phone previously when the message was played (i.e., another phone or no phone was connected), or has heard/seen the message, but now owns a new phone. Similarly, the phone may have been reconnected after having been deleted 317. Even if the system has record of the deletion, any records relating to displayed or not display disclaimers may no longer exist. Accordingly, if the phone is newly connected or connected after previous deletion, the process may show the disclaimer 315, 319. Alternatively, if the phone was previously connected and is not being newly re-connected, the process may assume the disclaimer has already been shown and avoid showing the disclaimer.

Figure 4:
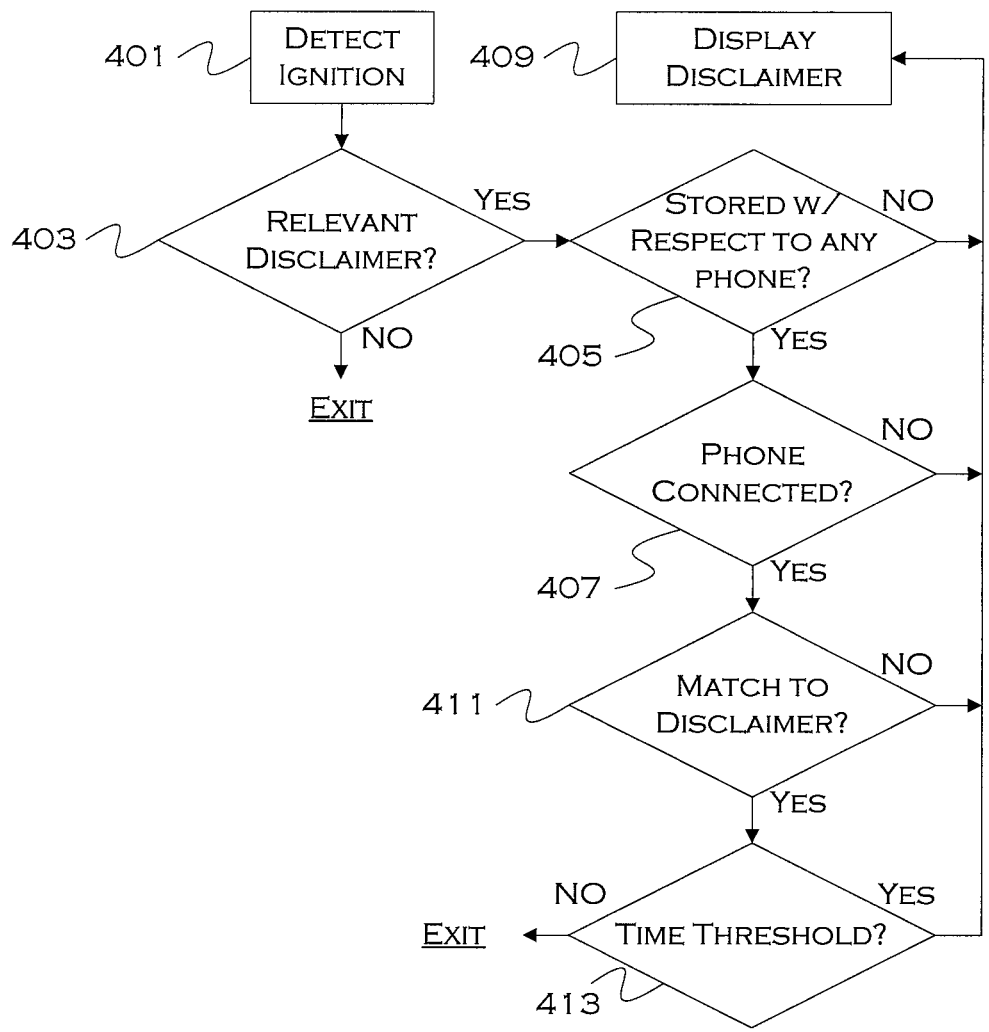
FIG. 4 shows an illustrative example of another phone detection and message display process.

FIG. 4 shows an illustrative example of another phone detection and message display process. This exemplary process has some additional components associated therewith. In this illustrative example shown, the process again detects the ignition state of a vehicle 401. Alternatively, merely turning the key to enable a display or audio output could be sufficient to enable the process, if desired.

Next, the process determines if there is a relevant disclaimer or agreement to be displayed 403. For example, without limitation, the process could determine if there is a tracking disclaimer and if tracking is enabled, in another example, the process could determine if there is a navigation disclaimer, and if navigation is enabled. Numerous examples of possible disclaimers, notifications and agreements can be included here, along with accompanying feature enablement if required or desired.

If there is no relevant notification to be displayed, the process exits (although an update to the process, which provides a new notification, even mid-drive, could cause a repeat occurrence of the process). If there is a relevant notification, the process then checks to see if the notification is stored with respect to any stored phone profile 405. For example, if there are two phone profiles, A and B, each may have varied notifications stored therewith. In this illustrative example, for exemplary purposes, a stored notification is a potentially non-repeating notification that has been previously displayed, in its present version if versions consideration is applied, when phone A or B has been connected. The notification (or some indicia) is then stored with respect to the connected phone and will not necessarily be displayed if that phone is again connected.

If there is no record of the notification having been stored with respect to any of the stored phones, or if there are no stored phones, the disclaimer may then be displayed 409. If the notification has been stored with respect to at least one phone profile, the process then determines if a phone is connected to the system 407. Although not shown, some time period may be provided during which a phone can connect, and the process may wait at this point until that time period elapses.

If there is no phone connected within the time period (if any), the process will again display a disclaimer 409. As previously noted, other driver/occupant detection methods may alternatively be employed, if phone identification of occupant fails. If there is a connected phone, the process determines if the phone is associated with a stored phone (e.g., A or B) to which the notification also correlates (i.e., has been stored) 411. If not, then this phone is new, newly connected, or connected after deletion, and thus the disclaimer is again displayed.

Finally, in this example, it is considered that some notifications may have time-stamps associated therewith, for which disclaimers are repeated following an elapsed time period. If there is a time threshold that has been passed 413, the disclaimer may again be displayed. The timer can be reset, and, additionally, the duration of display may be changed from a standard duration, if desired. If the time threshold does not exist or has not elapsed, the process may exit. The time threshold can also be measured in number of non-displays or any other suitable periodic tracking.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
select a message;
determine if a phone is wirelessly connected to a vehicle computing system;
display the message if no wirelessly connected phone is found;
determine if the message was displayed during a connected phone's earlier connection;
display the message if the message was not previously displayed during the connected phone's earlier connection; and
skip display of the message if the message was previously displayed during the connected phone's earlier connection.

2. The system of claim 1, wherein the processor is further configured to select the message based on an enabled vehicle function.

3. The system of claim 2, wherein the vehicle function is a tracking function.

4. The system of claim 2, wherein the vehicle function is a navigation function.

5. The system of claim 1, wherein the processor is further configured to select the message based on a correspondence with a vehicle identification number (VIN).

6. The system of claim 1, wherein the processor is further configured to determine if a message version has changed since the message was previously displayed during the connected phone's earlier connection.

7. The system of claim 6, wherein the processor is further configured to display a message for which the message version has changed since the message was previously displayed during the connected phone's earlier connection.

8. The system of claim 1, wherein the processor is further configured to determine if predetermined period has elapsed since the message was previously displayed during the connected phone's earlier connection.

9. The system of claim 8, wherein the processor is further configured to display the message if predetermined period has elapsed since the message was previously displayed during the connected phone's earlier connection.

10. A computer-implemented method comprising:
selecting a message;
determining if a phone is wirelessly connected to a vehicle computing system;
displaying the message if no wirelessly connected phone is found;
determining if the message was displayed during a connected phone's earlier connection;
displaying the message if the message was not previously displayed during the connected phone's earlier connection; and
skipping display of the message if the message was previously displayed during the connected phone's earlier connection.

11. The method of claim 10, wherein the selecting the message is based on an enabled vehicle function.

12. The method of claim 11, wherein the vehicle function is a tracking function.

13. The method of claim 11, wherein the vehicle function is a navigation function.

14. The method of claim 10, wherein the selecting the message is based on a correspondence with a vehicle identification number (VIN).

15. The method of claim 10, further comprising determining if a message version has changed since the message was previously displayed during the connected phone's earlier connection.

16. The method of claim 15, further comprising displaying a message for which the message version has changed since the message was previously displayed during the connected phone's earlier connection.

17. The method of claim 10, further comprising determining if predetermined period has elapsed since the message was previously displayed during the connected phone's earlier connection.

18. The method of claim 17, further comprising displaying the message if predetermined period has elapsed since the message was previously displayed during the connected phone's earlier connection.

19. A non-transitory computer readable storage medium, storing instructions that, when executed, cause a processor to perform a method comprising:
   selecting a message;
   determining if a phone is wirelessly connected to a vehicle computing system;
      displaying the message if no wirelessly connected phone is found;
      determining if the message was displayed during a connected phone's earlier connection;
         displaying the message if the message was not previously displayed during the connected phone's earlier connection; and
         skipping display of the message if the message was previously displayed during the connected phone's earlier connection.

20. The storage medium of claim 19, wherein the selecting the message is based on an enabled vehicle function.

\* \* \* \* \*